US011226200B2

(12) United States Patent
Tang

(10) Patent No.: US 11,226,200 B2
(45) Date of Patent: Jan. 18, 2022

(54) METHOD AND APPARATUS FOR MEASURING DISTANCE USING VEHICLE-MOUNTED CAMERA, STORAGE MEDIUM, AND ELECTRONIC DEVICE

(71) Applicant: BOE TECHNOLOGY GROUP CO., LTD., Beijing (CN)

(72) Inventor: Xiaojun Tang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 167 days.

(21) Appl. No.: 16/623,859

(22) PCT Filed: Jan. 31, 2018

(86) PCT No.: PCT/CN2018/074821
§ 371 (c)(1),
(2) Date: Dec. 18, 2019

(87) PCT Pub. No.: WO2019/000945
PCT Pub. Date: Jan. 3, 2019

(65) Prior Publication Data
US 2020/0217656 A1  Jul. 9, 2020

(30) Foreign Application Priority Data

Jun. 28, 2017  (CN) .......................... 201710509281.7

(51) Int. Cl.
*G06K 9/00* (2006.01)
*G01C 3/08* (2006.01)
(Continued)

(52) U.S. Cl.
CPC .......... *G01C 3/085* (2013.01); *G06K 9/00798* (2013.01); *G06K 9/2054* (2013.01);
(Continued)

(58) Field of Classification Search
CPC .......... G01C 3/085; G01C 11/00; G01C 3/10; G06K 9/00798; G06K 9/2054;
(Continued)

(56) References Cited

U.S. PATENT DOCUMENTS 5,073,819 A   12/1991  Gates et al.
8,847,982 B2   9/2014  Kmiecik et al.
(Continued)

FOREIGN PATENT DOCUMENTS

CA    2078556     8/1995
CN    101523157   9/2009
(Continued)

OTHER PUBLICATIONS

International Search Report and Written Opinion dated May 4, 2018 for PCT Patent Application No. PCT/CN2018/074821.
(Continued)

*Primary Examiner* — Mahendra R Patel
(74) *Attorney, Agent, or Firm* — Thomas | Horstemeyer, LLP

(57) ABSTRACT

The present disclosure relates to a method and an apparatus for measuring a distance using a vehicle-mounted camera, a storage medium, and an electronic device. The method includes: calibrating a camera based on camera calibration images to obtain a camera parameter; detecting parallel lane lines to obtain a vanishing point of the parallel lane lines according to the detected parallel lane lines; calculating a pitch angle of the camera according to the camera parameter and the vanishing point; determining information of an object to be detected in an image captured by the camera; and calculating a distance from the object to be detected to the camera and a size of the object to be detected according to the information of the object to be detected, the pitch angle of the camera, and the camera parameter.

20 Claims, 5 Drawing Sheets

(51) Int. Cl.
  *G06K 9/20* (2006.01)
  *G06K 9/46* (2006.01)
  *H04N 5/225* (2006.01)

(52) U.S. Cl.
  CPC ....... *G06K 9/4604* (2013.01); *G06K 2209/23* (2013.01); *H04N 5/2253* (2013.01)

(58) Field of Classification Search
  CPC ............. G06K 9/4604; G06K 2209/23; G06K 9/00805; H04N 5/2253; H04N 17/002; B60R 21/0152; B60R 21/01534; B60R 21/01538; B60R 21/01536; G06T 7/80
  USPC .......................................................... 382/103
  See application file for complete search history.

(56) References Cited

U.S. PATENT DOCUMENTS

| | | | |
|---|---|---|---|
| 9,285,460 B2* | 3/2016 | Haglund | G06T 7/80 |
| 9,619,894 B2 | 4/2017 | Wang et al. | |
| 9,664,789 B2* | 5/2017 | Rosenblum | G01S 13/867 |
| 9,762,880 B2* | 9/2017 | Pflug | G06T 15/20 |
| 10,147,017 B2 | 12/2018 | Mohamed | G06T 3/0012 |
| 2007/0086624 A1* | 4/2007 | Breed | B60R 21/01516 |
| | | | 382/104 |
| 2008/0051957 A1* | 2/2008 | Breed | B60R 21/0152 |
| | | | 701/36 |
| 2010/0091017 A1 | 4/2010 | Kmiecik et al. | |
| 2010/0232639 A1* | 9/2010 | Ibrahim | G06T 7/70 |
| | | | 382/100 |
| 2010/0259539 A1* | 10/2010 | Papanikolopoulos | G06T 7/70 |
| | | | 345/420 |
| 2012/0050074 A1* | 3/2012 | Bechtel | G06K 9/00798 |
| | | | 340/988 |
| 2015/0161456 A1* | 6/2015 | Chevalley | H04N 17/002 |
| | | | 348/148 |
| 2015/0332098 A1* | 11/2015 | Wang | G06K 9/3241 |
| | | | 382/103 |
| 2016/0034771 A1* | 2/2016 | Schamp | B60G 17/019 |
| | | | 348/148 |
| 2016/0243704 A1* | 8/2016 | Vakanski | B25J 9/1697 |
| 2016/0353082 A1* | 12/2016 | Pitts | G02B 3/005 |
| 2017/0111558 A1* | 4/2017 | Brueckner | G06T 7/80 |
| 2018/0357791 A1* | 12/2018 | Dworakowski | G06T 7/74 |

FOREIGN PATENT DOCUMENTS

| | | | | |
|---|---|---|---|---|
| CN | 102661733 A | 9/2012 | | |
| CN | 103729837 | 4/2014 | | |
| CN | 102661733 B | 6/2014 | | |
| CN | 103927754 A | 7/2014 | | |
| CN | 105243655 | 1/2016 | | |
| CN | 103927754 B | 8/2016 | | |
| CN | 106153000 | 11/2016 | | |
| CN | 106289159 | 1/2017 | | |
| DE | 19911665 A1 * | 9/2000 | ............. | B60R 1/00 |
| EP | 0523166 | 1/1993 | | |
| EP | 2074379 A1 | 7/2009 | | |
| EP | 2074379 B1 | 2/2016 | | |
| WO | 9115924 | 10/1991 | | |
| WO | 2008044911 | 4/2008 | | |
| WO | 2008044927 | 4/2008 | | |

OTHER PUBLICATIONS

1st Office Action dated Oct. 25, 2019 for Chinese Patent Application No. 201710509281.7.
2nd Office Action dated Mar. 19, 2020 for Chinese Patent Application No. 201710509281.7.
Guo, Lei, et al. "Study on real-time distance detection based on monocular vision technique." Journal of Image and Graphics 11.1 (2006): 74-81.

* cited by examiner

METHOD AND APPARATUS FOR MEASURING DISTANCE USING VEHICLE-MOUNTED CAMERA, STORAGE MEDIUM, AND ELECTRONIC DEVICE

CROSS-REFERENCE TO RELATED APPLICATIONS

This application is a § 371 national phase application of International Application No. PCT/CN2018/074821, filed on Jan. 31, 2018, which is based upon and claims priority to Chinese Patent Application No. 201710509281.7, titled "METHOD AND APPARATUS FOR MEASURING DISTANCE USING VEHICLE-MOUNTED CAMERA, STORAGE MEDIUM, AND ELECTRONIC DEVICE" and filed on Jun. 28, 2017, the entire contents of which are incorporated herein by reference.

TECHNICAL FIELD

The present disclosure relates to the field of distance measurement technologies and, more particularly, to a method and an apparatus for measuring a distance using a vehicle-mounted camera, a storage medium, and an electronic device.

BACKGROUND

With the development of the economy, the number of vehicles on road is increasing. The frequent occurrence of traffic accidents may likely be caused by drivers' misjudgment to distances between vehicles. Therefore, it is important to control the distances between vehicles or distances between vehicles and pedestrians. In vehicle-mounted auxiliary systems, in order to provide accurate forward collision warning or pedestrian collision warning, it is necessary to measure distances to and sizes of forward vehicles and pedestrians to ensure whether to raise an alarm. Typically, the auxiliary system is only provided with one monocular camera. However, it is not sufficient to determine a distance to an object based on an image captured only using the monocular camera. Considering that road surface is usually horizontal, and objects to be detected such as the vehicles or pedestrians are close to the road surface, the distance between an object in the image and a camera as well as the size of the object may be determined based on geometric coordinate calculation.

At present, to calculate the distance between an object and a camera and the size of the object, it is usually necessary to determine an angle of the camera and a location of a vanishing point of the road surface. However, in some technologies, a gyroscope is employed to determine the angle of the camera. In this case, the gyroscope needs to be additionally installed in the auxiliary system. In some other technologies, the location of the vanishing point of the road surface needs to be specified by manual labeling. Actual operations of these technologies are cumbersome, and thus, a convenient method for measuring a distance using a vehicle-mounted camera is needed.

It is to be noted that the above information disclosed in this Background section is only for enhancement of understanding of the background of the present disclosure and therefore it may contain information that does not form the related art that is already known to a person of ordinary skill in the art.

SUMMARY

According to an aspect of the present disclosure, there is provided a method for measuring a distance using a vehicle-mounted camera.

The method for measuring a distance using a vehicle-mounted camera includes: calibrating a camera based on camera calibration images to obtain a camera parameter; detecting parallel lane lines to obtain a vanishing point of the parallel lane lines according to the detected parallel lane lines; calculating a pitch angle of the camera according to the camera parameter and the vanishing point; determining information of an object to be detected in an image captured by the camera; and calculating a distance from the object to be detected to the camera and a size of the object to be detected according to the information of the object to be detected, the pitch angle of the camera, and the camera parameter.

In an exemplary embodiment of the present disclosure, the camera calibration images are at least three images obtained by capturing an image by the camera at different angles and locations.

In an exemplary embodiment of the present disclosure, calibrating the camera calibration images includes: calibrating the camera calibration images using a Zhang Zhengyou calibration algorithm.

In an exemplary embodiment of the present disclosure, the detecting parallel lane lines includes: capturing an image containing the parallel lane lines; filtering the image containing the parallel lane lines by using a gradient edge detection operator to generate a gradient image; determining an optimal threshold of the gradient image by using a threshold determination algorithm, and performing binarization processing on the gradient image to obtain an edge pattern; detecting a straight line in the edge pattern using a feature extraction algorithm; and determining two straight lines adjacent to each other and having opposite deflection directions with respect to a height direction of the image as the parallel lane lines.

In an exemplary embodiment of the present disclosure, the object to be detected is represented as a rectangular window. The determining of information of an object to be detected in an image captured by the camera includes: determining a coordinate of an arbitrary point of the rectangular window corresponding to the object to be detected in the image captured by the camera and a width and a height of the rectangular window.

In an exemplary embodiment of the present disclosure, the camera is installed directly in front of a vehicle.

In an exemplary embodiment of the present disclosure, a coordinate of the vanishing point in the image captured by the camera is denoted as $(u_0, v_0)$, and the pitch angle of the camera is calculated based on a formula as below:

$$\varphi = \arctan\left(\frac{c_v - v_0}{f_v}\right)$$

wherein $\varphi$ represents the pitch angle, $f_v$ represents a focal length of a camera head of the camera, and $c_v$ represents a location coordinate of an optical center of the camera head.

In an exemplary embodiment of the present disclosure, the size of the object to be detected includes a height and a width of the object to be detected.

In an exemplary embodiment of the present disclosure, the distance from the object to be detected to the camera is calculated based on a formula as below:

$$D = \frac{f_v h_c + h_c(c_v - v_{t2})\tan(\varphi)}{v_{t2} - v_0}$$

wherein D represents the distance from the object to be detected to the camera, φ represents the pitch angle, $f_v$ represents a focal length of a camera head of the camera, $c_v$ represents a location coordinate of an optical center of the camera head, and a coordinate of a midpoint of a lower side of the rectangular window in the image is denoted as ($u_{t2}$, $v_{t2}$) and a corresponding spatial point coordinate is denoted as ($x_{t2}$, D, $-h_c$), and a coordinate of the vanishing point in the image captured by the camera is denoted as ($u_0$, $v_0$).

In an exemplary embodiment of the present disclosure, the height of the object to be detected is calculated based on a formula as below:

$$H = \frac{h_t(D + h_c \tan(\varphi))}{f_v + (c_v - v_t)\tan(\varphi)}$$

wherein H represents the height of the object to be detected, D represents the distance from the object to be detected to the camera, φ represents the pitch angle, $h_t$ represents the height of the rectangular window, $f_v$ represents a focal length of a camera head of the camera, $c_v$ represents a location coordinate of an optical center of the camera head, the coordinate of the arbitrary point is denoted as ($u_t$, $v_t$), and a coordinate of a midpoint of a lower side of the rectangular window in the image is denoted as ($u_{t2}$, $v_{t2}$) and a corresponding spatial point coordinate is denoted as ($x_{t2}$, D, $-h_c$).

In an exemplary embodiment of the present disclosure, the width of the object to be detected is calculated based on a formula as below:

$$W = \frac{w_t}{f_u}(D\cos(\varphi) + h_c \sin(\varphi))$$

wherein W represents the width of the object to be detected, D represents the distance from the object to be detected to the camera, φ represents the pitch angle, $f_u$ represents a focal length of a camera head of the camera, $w_t$ represents the width of the rectangular window, and a coordinate of a midpoint of a lower side of the rectangular window in the image are denoted as ($u_{t2}$, $v_{t2}$) and a corresponding spatial point coordinate is denoted as ($x_{t2}$, D, $-h_c$).

According to another aspect of the present disclosure, there is provided an apparatus for measuring a distance using a vehicle-mounted camera, which includes: a camera calibrator, configured to calibrate a camera based on camera calibration images to obtain a camera parameter; a vanishing point obtainer, configured to detect parallel lane lines to obtain a vanishing point of the parallel lane lines according to the detected parallel lane lines; a pitch angle calculator, configured to calculate a pitch angle of the camera according to the camera parameter and the vanishing point; an object to be detected determiner, configured to determine information of an object to be detected in an image captured by the camera; and a distance detector, configured to calculate a distance from the object to be detected to the camera and a size of the object to be detected according to the information of the object to be detected, the pitch angle of the camera, and the camera parameter.

In an exemplary embodiment of the present disclosure, the camera calibration images are at least three images obtained by capturing an image by the camera at different angles and locations.

In an exemplary embodiment of the present disclosure, calibrating the camera calibration images includes: calibrating the camera calibration images using a Zhang Zhengyou calibration algorithm.

In an exemplary embodiment of the present disclosure, the detecting parallel lane lines includes: capturing an image containing the parallel lane lines; filtering the image containing the parallel lane lines by using a gradient edge detection operator to generate a gradient image; determining an optimal threshold of the gradient image by using a threshold determination algorithm, and performing binarization processing on the gradient image to obtain an edge pattern; detecting a straight line in the edge pattern using a feature extraction algorithm; and determining two straight lines adjacent to each other and having opposite deflection directions with respect to a height direction of the image as the parallel lane lines.

In an exemplary embodiment of the present disclosure, the object to be detected is represented as a rectangular window. The determining of information of an object to be detected in an image captured by the camera includes: determining a coordinate of an arbitrary point of the rectangular window corresponding to the object to be detected in the image captured by the camera and a width and a height of the rectangular window.

In an exemplary embodiment of the present disclosure, the camera is installed directly in front of a vehicle.

In an exemplary embodiment of the present disclosure, a coordinate of the vanishing point in the image captured by the camera is denoted as ($u_0$, $v_0$), and the pitch angle of the camera is calculated based on a formula as below:

$$\varphi = \arctan\left(\frac{c_v - v_0}{f_v}\right)$$

wherein φ represents the pitch angle, $f_v$ represents a focal length of a camera head of the camera, and $c_v$ represents a location coordinate of an optical center of the camera head.

In an exemplary embodiment of the present disclosure, the size of the object to be detected includes a height and a width of the object to be detected.

In an exemplary embodiment of the present disclosure, the distance from the object to be detected to the camera is calculated based on a formula as below:

$$D = \frac{f_v h_c + h_c(c_v - v_{t2})\tan(\varphi)}{v_{t2} - v_0}$$

wherein D represents the distance from the object to be detected to the camera, φ represents the pitch angle, $f_v$ represents a focal length of a camera head of the camera, $c_v$ represents a location coordinate of an optical center of the camera head, and a coordinate of a midpoint of a lower side of the rectangular window in the image is denoted as ($u_{t2}$, $v_{t2}$) and a corresponding spatial point coordinate is denoted as $(x_{t2}, D, -h_c)$, and a coordinate of the vanishing point in the image captured by the camera is denoted as $(u_0, v_0)$.

In an exemplary embodiment of the present disclosure, the height of the object to be detected is calculated based on a formula as below:

$$H = \frac{h_t(D + h_c \tan(\varphi))}{f_v + (c_v - v_t) \tan(\varphi)}$$

wherein H represents the height of the object to be detected, D represents the distance from the object to be detected to the camera, $\varphi$ represents the pitch angle, $h_t$ represents the height of the rectangular window, $f_v$ represents a focal length of a camera head of the camera, $c_v$ represents a location coordinate of an optical center of the camera head, the coordinate of the arbitrary point is denoted as $(u_t, v_t)$, and a coordinate of a midpoint of a lower side of the rectangular window in the image is denoted as $(u_{t2}, v_{t2})$ and a corresponding spatial point coordinate is denoted as $(x_{t2}, D, -h_c)$.

In an exemplary embodiment of the present disclosure, the width of the object to be detected is calculated based on a formula as below:

$$W = \frac{w_t}{f_u}(D \cos(\varphi) + h_c \sin(\varphi))$$

wherein W represents the width of the object to be detected, D represents the distance from the object to be detected to the camera, $\varphi$ represents the pitch angle, $f_u$ represents a focal length of a camera head of the camera, $w_t$ represents the width of the rectangular window, and a coordinate of a midpoint of a lower side of the rectangular window in the image is denoted as $(u_{t2}, v_{t2})$ and a corresponding spatial point coordinate is denoted as $(x_{t2}, D, -h_c)$.

According to an aspect of the present disclosure, there is provided a storage medium, which stores a computer program. When the computer program is executed by a processor, the method for measuring a distance using a vehicle-mounted camera according to any one of the above embodiments is implemented.

According to an aspect of the present disclosure, there is provided an electronic device, which includes: a processor; and a memory, configured to store executable instructions of the processor. The processor is configured to perform the method for measuring a distance using a vehicle-mounted camera according to any one of the above embodiments by executing the executable instructions.

It is to be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate embodiments conforming to the present disclosure and, together with the description, serve to explain the principle of the present disclosure. Understandably, the accompanying drawings in the following description show merely some embodiments of the present disclosure, and persons of ordinary skill in the art may still derive other drawings from these accompanying drawings without creative efforts. In the drawings.

DETAILED DESCRIPTION

Figure 1:
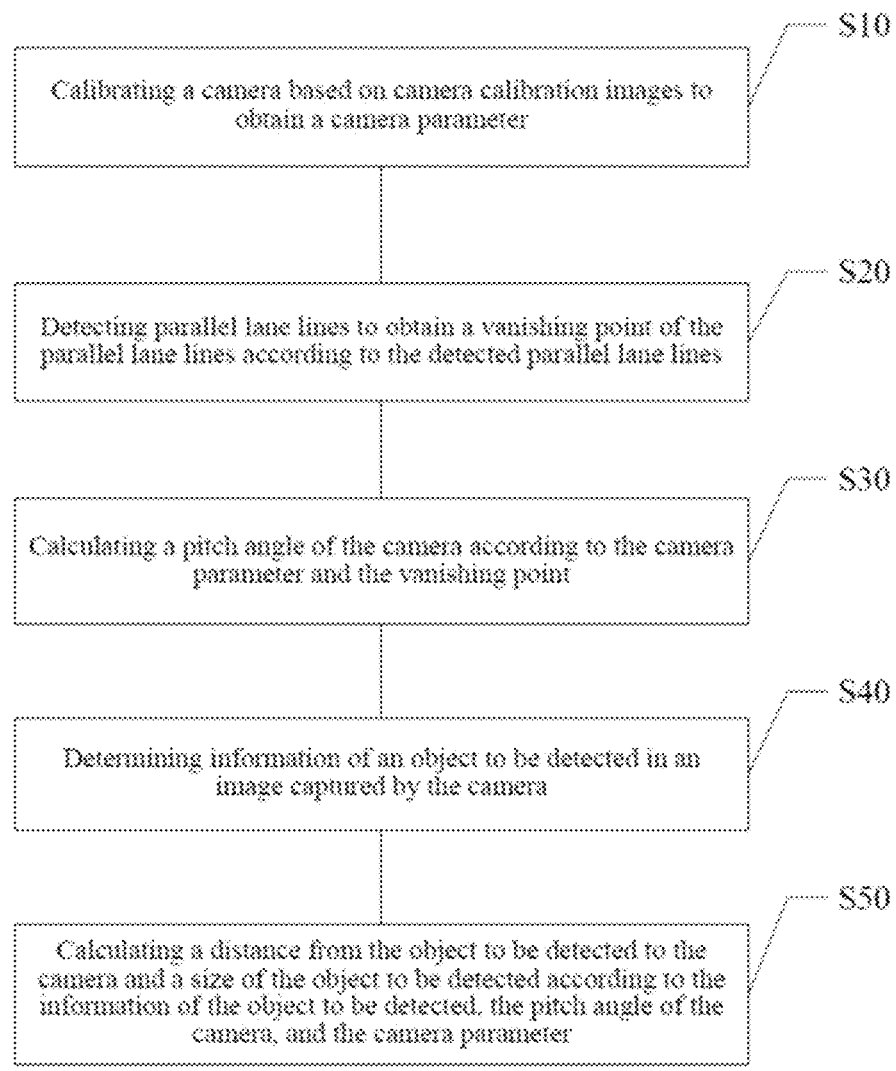
FIG. 1 schematically illustrates a flowchart of a method for measuring a distance using a vehicle-mounted camera according to an exemplary embodiment of the present disclosure.

Exemplary embodiments will be described more comprehensively by referring to the accompanying drawings now. However, the exemplary embodiments can be embodied in many forms and should not be construed as being limited to the embodiments set forth herein; rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the present disclosure. Those skilled in the art will recognize, however, that the technical solution of the present disclosure may be practiced without one or more of the specific details described, or that other methods, components, devices, steps, etc., may be employed. In other instances, well-known technical solutions are not shown or described in detail to avoid obscuring aspects of the present disclosure.

In addition, the accompanying drawings are merely exemplary illustration of the present disclosure, and are not necessarily drawn to scale. The same reference numerals in the drawings denote the same or similar parts, and thus repeated description thereof will be omitted. Some blocks shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

The flowcharts as shown in the accompanying drawings are merely exemplary description instead of necessarily including all the steps. For example, some steps may be further divided, while some steps may be combined or partly combined. Therefore, the actual execution sequences may be changed according to the actual conditions.

At present, a camera may be used to photograph surroundings of a vehicle, and captured images may be analyzed to determine distances between vehicles, distances between the vehicle and pedestrians, and distances between the vehicle and other obstacles, and sizes of the vehicles, the pedestrians or other obstacles displayed in the images may also be determined to facilitate drivers to make safety judgment.

Figure 2:
FIG. 2 schematically illustrates an exemplary image captured by a vehicle-mounted camera.

In the following description, the present disclosure is described by taking an example where a camera is installed directly in front of a vehicle, and FIG. 2 schematically illustrates an exemplary image captured by the camera. However, it is to be understood that the distance measurement can also be implemented through the content recorded in the solution even though the camera is installed at another location of the vehicle. In addition, a yaw angle of the camera is approximately equal to zero, and a height $h_c$ from the camera to the ground may be measured using a ruler.

FIG. 1 schematically illustrates a flowchart of a method for measuring a distance using a vehicle-mounted camera according to an exemplary embodiment of the present disclosure. Referring to FIG. 1, the method for measuring a distance using a vehicle-mounted camera may include following steps:

step S10: calibrating a camera based on camera calibration images to obtain a camera parameter;

step S20: detecting parallel lane lines to obtain a vanishing point of the parallel lane lines according to the detected parallel lane lines;

step S30: calculating a pitch angle of the camera according to the camera parameter and the vanishing point;

step S40: determining information of an object to be detected in an image captured by the camera; and step S50: calculating a distance from the object to be detected to the camera and a size of the object to be detected according to the information of the object to be detected, the pitch angle of the camera, and the camera parameter.

In the method for measuring a distance using a vehicle-mounted camera according to this exemplary embodiment of the present disclosure, the pitch angle of the camera is automatically calculated based on the obtained camera parameter and the automatically detected parallel lane lines, and the objective of accurately measuring the distance to and the size of the object to be detected is achieved based on the information of the object to be detected. In addition, in the process of measuring a distance according to this solution, no manual intervention is required, and thus this method is convenient and easy to be implemented.

Each step of the method for measuring a distance using a vehicle-mounted camera according to this exemplary embodiment of the present disclosure will be described in detail below.

In Step S10, a camera is calibrated based on camera calibration images to obtain a camera parameter.

In an exemplary embodiment of the present disclosure, an internal parameter matrix of the camera may be denoted as:

$$\begin{bmatrix} f_u & 0 & c_u \\ 0 & f_v & c_v \\ 0 & 0 & 1 \end{bmatrix}$$

wherein $f_u$ and $f_v$ represent a focal length of a camera head, and $c_u$ and $c_v$ represent a location coordinate of an optical center of the camera head. By way of calibration, $f_u$, $f_v$, $c_u$ and $c_v$ may be calculated out.

The calibration process of the camera may be completed either offline or online. For example, a linear calibration method (e.g., Faugeras calibration method, etc.), a nonlinear optimization calibration method (e.g., Levenberg-Marquadt algorithm, etc.), a two-step calibration method (e.g., Tsai two-step method, Zhang Zhengyou calibration algorithm, etc.), or other methods may be employed to calculate $f_u$, $f_v$, $c_u$ and $c_v$, which are not particularly limited in this exemplary embodiment.

Taking the Zhang Zhengyou calibration algorithm as an example, an image in which a checkerboard is drawn may be placed in front of the camera as the camera calibration image. Since four unknowns need to be calculated out, at least three images are captured at different angles and locations, so that $f_u$, $f_v$, $c_u$ and $c_v$ may be calculated out linearly and uniquely using the Zhang Zhengyou calibration algorithm.

That is, in an exemplary embodiment of the present disclosure, the at least three images may be used as the camera calibration images, and the camera calibration images may be processed by using the Zhang Zhengyou calibration algorithm to automatically calculate out the camera parameter.

Further, the camera calibration images may also be other images than the image in which the checkerboard is drawn, which is not particularly limited in this exemplary embodiment.

In Step S20, parallel lane lines are detected to obtain a vanishing point of the parallel lane lines according to the detected parallel lane lines.

In an exemplary embodiment of the present disclosure, in the process of detecting the parallel lane lines, an image including the parallel lane lines may be first captured. This image may be as shown in FIG. 2.

Next, the image containing the parallel lane lines may be filtered by using a gradient edge detection operator to generate a gradient image. For example, the image containing the parallel lane lines may be filtered by using a Sobel operator. A Sobel operator in a horizontal direction and a Sobel operator in a vertical direction are respectively as follows:

$$\begin{bmatrix} -1 & 0 & 1 \\ -2 & 0 & 2 \\ -1 & 0 & 1 \end{bmatrix}, \begin{bmatrix} 1 & 2 & 1 \\ 0 & 0 & 0 \\ -1 & -2 & -1 \end{bmatrix}$$

Moreover, the process of filtering images using other gradient edge detection operators (e.g., a Robert operator, a Prewitt operator, etc.) also belongs to the conception of the present disclosure.

Subsequently, an optimal threshold of the gradient image may be determined by using a threshold determination algorithm, and binarization processing is performed on the gradient image to obtain an edge pattern. In an exemplary embodiment of the present disclosure, the threshold determination algorithm may be, for example, the Otsu method.

Next, a straight line may be detected in this edge pattern using a feature extraction algorithm. In an exemplary embodiment of the present disclosure, the feature extraction algorithm may be, for example, the Hough transform algorithm.

Figure 3:
FIG. 3 illustrates a schematic diagram of detecting parallel lane lines according to the exemplary image as shown in FIG. 2.

Next, two straight lines adjacent to each other and having opposite deflection directions with respect to a height direction of the image may be determined as the parallel lane lines. Referring to FIG. 3, four candidate straight line segments are detected in a lane line image. However, two adjacent straight line segments in the middle of the image have opposite deflection directions with respect to the height direction of the image. That is, in the image, the left straight line segment of the two adjacent straight line segments is deflected to the right with respect to the height direction of the image, and the right straight line segment of the two adjacent straight line segments is deflected to the left with respect to the height direction of the image, thus the two straight lines may be regarded as parallel lane lines.

Figure 4:
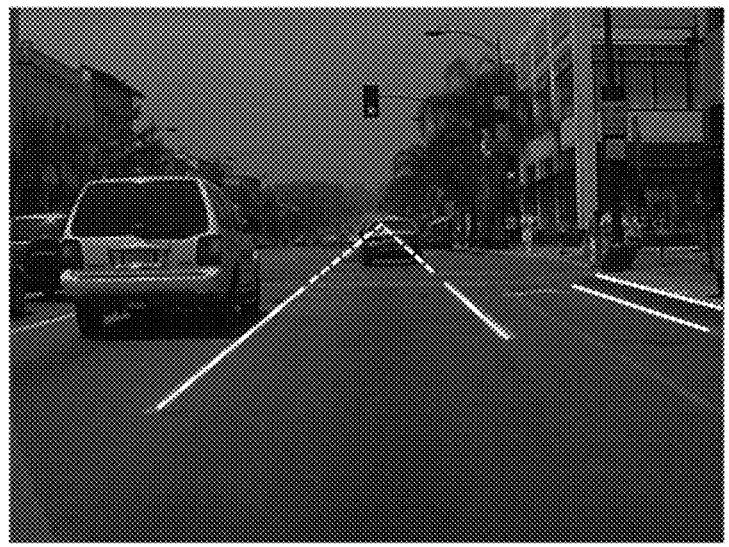
FIG. 4 illustrates a schematic diagram of determining a vanishing point of the parallel lane lines according to the exemplary image as shown in FIG. 2.

After the parallel lane lines are detected, the two straight lines may be extended in an upward direction in the image, such that there is an intersection point between the two extended straight lines. The intersection point is the vanishing point of the lane lines, and a coordinate of the vanishing point in the image may be denoted as $(u_0, v_0)$. FIG. 4 illustrates a schematic diagram of this vanishing point.

In Step S30, a pitch angle of the camera is calculated according to the camera parameter and the vanishing point.

In the process of calculating the pitch angle $\varphi$, first, a spatial point coordinate may be denoted as $(x, y, z)$, a corresponding coordinate of the midpoint of the image is $(u, v)$, and a camera coordinate transformation formula may be expressed as follows:

$$\begin{bmatrix} u \\ v \\ 1 \end{bmatrix} = k \begin{bmatrix} f_u & 0 & c_u \\ 0 & f_v & c_v \\ 0 & 0 & 1 \end{bmatrix} \begin{bmatrix} 1 & 0 & 0 \\ 0 & 0 & -1 \\ 0 & 1 & 0 \end{bmatrix} \begin{bmatrix} 1 & 0 & 0 \\ 0 & \cos(\varphi) & -\sin(\varphi) \\ 0 & \sin(\varphi) & \cos(\varphi) \end{bmatrix} \begin{bmatrix} x \\ y \\ z \end{bmatrix}$$

By simplifying this formula, a formula may be obtained as below:

$$\begin{bmatrix} u \\ v \\ 1 \end{bmatrix} = k \begin{bmatrix} f_u & c_u \cos(\varphi) & -c_u \sin(\varphi) \\ 0 & c_v \cos(\varphi) - f_v \sin(\varphi) & -c_v \sin(\varphi) - f_v \cos(\varphi) \\ 0 & \cos(\varphi) & -\sin(\varphi) \end{bmatrix} \begin{bmatrix} x \\ y \\ z \end{bmatrix}$$

Next, the spatial point coordinate $(x, y, z)$ may be set as $(0, 1, 0)$, and then the coordinate of the vanishing point is calculated out:

$$\begin{bmatrix} u_0 \\ v_0 \\ 1 \end{bmatrix} = k \begin{bmatrix} c_u \cos(\varphi) \\ c_v \cos(\varphi) - f_v \sin(\varphi) \\ \cos(\varphi) \end{bmatrix}$$

i.e., $u_0 = c_u$, $v_0 = c_v - f_v \tan(\varphi)$

Finally, the pitch angle $\varphi$ can be calculated out:

$$\varphi = \arctan\left(\frac{c_v - v_0}{f_v}\right)$$

In Step S40, information of an object to be detected in an image captured by the camera is determined.

Figure 5:
FIG. 5 illustrates a schematic diagram of determining an object to be detected according to the exemplary image as shown in FIG. 2.

In an exemplary embodiment of the present disclosure, an object to be detected, such as a vehicle or a pedestrian, may be first detected in an image captured by the camera based on, for example, an image feature extraction algorithm (e.g., the HOG feature algorithm or the like) for object detection. As shown in FIG. 5, the detected object may be represented as a rectangular window. However, the detected object may also be represented as other recognizable graphic window, for example, a circle or the like, which is not particularly limited in this exemplary embodiment.

Next, information of the object to be detected may be determined. Specifically, a coordinate of a preset point of the rectangular window as well as a width and a height of the rectangular window may be determined, whereby the location of the rectangular window in the image may be determined. The preset point may be one of four vertices of the rectangular window. However, the preset point may also be any point within the rectangular window, which is not specifically limited in this exemplary embodiment.

Taking an example where the preset point is the upper left vertex of the rectangular window, the coordinate $(u_t, v_t)$ of the preset point and the width $w_t$ and the height $h_t$ of the rectangular window may be obtained. That is, according to some embodiments of the present disclosure, the coordinate $(u_t, v_t)$ of the preset point and the width $w_t$ and the height $h_t$ of the rectangular window may be used as information of the object to be detected.

In Step S50, a distance from the object to be detected to the camera and a size of the object to be detected are calculated according to the information of the object to be detected, the pitch angle of the camera, and the camera parameter.

First, a distance D from the object to be detected to the camera may be calculated. A coordinate of a midpoint of a lower side of the rectangular window in the image is denoted as $(u_{t2}, v_{t2})$, the following formula may be obtained:

$$(u_{t2}, v_{t2}) = \left(u_t + \frac{w_t}{2}, v_t + h_t\right)$$

By substituting a point $(x_{t2}, D, -h_c)$ in the space coordinate system corresponding to the coordinate $(u_{t2}, v_{t2})$ into the camera coordinate transformation formula simplified in Step S30, the following formula may be obtained:

$$\begin{bmatrix} u_{t2} \\ v_{t2} \\ 1 \end{bmatrix} = k \begin{bmatrix} f_u & c_u \cos(\varphi) & -c_u \sin(\varphi) \\ 0 & c_v \cos(\varphi) - f_v \sin(\varphi) & -c_v \sin(\varphi) - f_v \cos(\varphi) \\ 0 & \cos(\varphi) & -\sin(\varphi) \end{bmatrix} \begin{bmatrix} x_{t2} \\ D \\ -h_c \end{bmatrix}$$

By simplifying the above formula, it obtains:

$v_{t2}(D\cos(\varphi)+h_c \sin(\varphi))=(c_v \cos(\varphi)-f_v \sin(\varphi))D+(c_v \sin(\varphi)+f_v \cos(\varphi))h_c$ $v_{t2}(D+h_c \tan(\varphi))=(c_v-f_v \tan(\varphi))D+(c_v \tan(\varphi)+f_v)h_c$ $v_{t2}(D+h_c \tan(\varphi))=v_0 D+(c_v \tan(\varphi)+f_v)h_c$ The distance D from the object to be detected to the camera may be obtained as:

$$D = \frac{f_v h_c + h_c(c_v - v_{t2})\tan(\varphi)}{v_{t2} - v_0}$$

Next, the height H of the object to be detected may be calculated. A coordinate of a midpoint of an upper side of the rectangular window in the image may be denoted as ($u_{t2}$, $v_{t2}-h_t$). By substituting point ($x_{t2}$, D, H–$h_c$) in the corresponding space coordinate system into the camera coordinate transformation formula simplified in Step S30, it may obtain:

$$\begin{bmatrix} u_{t2} \\ v_{t2}-h_t \\ 1 \end{bmatrix} = k \begin{bmatrix} f_u & c_u \cos(\varphi) & -c_u \sin(\varphi) \\ 0 & c_v \cos(\varphi) - f_v \sin(\varphi) & -c_v \sin(\varphi) - f_v \cos(\varphi) \\ 0 & \cos(\varphi) & -\sin(\varphi) \end{bmatrix} \begin{bmatrix} x_{t2} \\ D \\ H-h_c \end{bmatrix}$$

By simplifying the above formula, it obtains:

$$(v_{t2} - h_t)[D - (H - h_c)\tan(\varphi)] =$$
$$D(c_v - f_v \tan(\varphi)) - (H - h_c)(f_v + c_v \tan(\varphi))$$

$$H - h_c = \frac{D(v_0 - v_{t2} + h_t)}{f_v + (c_v - v_{t2} + h_t)\tan(\varphi)}$$

$$H = \frac{D(v_0 - v_{t2} + h_t)}{f_v + (c_v - v_t)\tan(\varphi)} + h_c$$

The height H of the object to be detected is obtained.

$$H = \frac{h_t(D + h_c \tan(\varphi))}{f_v + (c_v - v_t)\tan(\varphi)}$$

In addition, the width W of the object to be detected may be calculated. At this moment, the camera coordinate transformation formula may be as follows:

$$\begin{bmatrix} u \\ v_{t2} \\ 1 \end{bmatrix} = k \begin{bmatrix} f_u & c_u \cos(\varphi) & -c_u \sin(\varphi) \\ 0 & c_v \cos(\varphi) - f_v \sin(\varphi) & -c_v \sin(\varphi) - f_v \cos(\varphi) \\ 0 & \cos(\varphi) & -\sin(\varphi) \end{bmatrix} \begin{bmatrix} x \\ D \\ -h_c \end{bmatrix}$$

By deriving the above formula, it obtains:

$$w_t = \frac{W f_u}{D \cos(\varphi) + h_c \sin(\varphi)}$$

The width W of the object to be detected is obtained:

$$W = \frac{w_t}{f_u}(D \cos(\varphi) + h_c \sin(\varphi))$$

Through the calculation processes in the above method, a vehicle-mounted auxiliary system may calculate the distances from a vehicle, a pedestrian or other obstacle to the camera, as well as the size of the vehicles, the pedestrian or other obstacle in the image captured by the camera. Furthermore, the method for measuring a distance using a vehicle-mounted camera in an exemplary embodiment of the present disclosure may further include: transmitting the distances from the vehicle, the pedestrian or other obstacle to the camera, as well as the sizes of the vehicle, the pedestrian or other obstacle to an alarm apparatus, and comparing the calculation result with a preset alarm threshold. When the calculation result exceeds the preset alarm threshold, an alarm may be raised to remind a driver to control vehicle speed and adjust driving direction.

Figure 6:
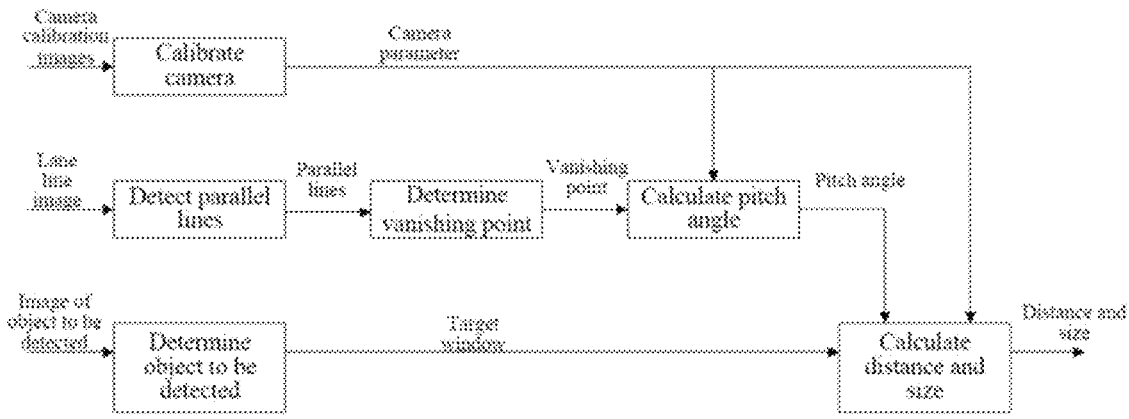
FIG. 6 schematically illustrates a flowchart of concrete implementation of a method for measuring a distance using a vehicle-mounted camera according to an exemplary embodiment of the present disclosure.

The entire flow of the method for measuring a distance using a vehicle-mounted camera of the present disclosure is described with reference to FIG. 6. The method for measuring a distance using a vehicle-mounted camera of the present disclosure may be divided into three method processes. In a first method process, the camera may be calibrated based on the camera calibration image using the Zhang Zhengyou calibration algorithm to obtain the camera parameter. In a second method process, parallel lines may be detected according to the image captured by the camera, and a vanishing point is determined, and a pitch angle of the camera is calculated according to a coordinate of the vanishing point and the camera parameter obtained in the first method process. In a third method process, an object to be detected in the image may be represented as a rectangular window, and a preset point, a width and a height of the rectangular window are used as information of the object to be detected. Finally, the distance from the object to be detected to the camera and the size of the object to be detected may be calculated out according to the results obtained in the three method processes.

It is to be noted that although steps of the method in the present disclosure are described in a particular order in the accompanying drawings, this does not require or imply to execute these steps necessarily according to the particular order, or this does not mean that the expected result cannot be implemented unless all the shown steps are executed. Additionally or alternatively, some steps may be omitted, a plurality of steps may be combined into one step for execution, and/or one step may be decomposed into a plurality of steps for execution.

Further, an exemplary embodiment further provides an apparatus for measuring a distance using a vehicle-mounted camera.

Figure 7:
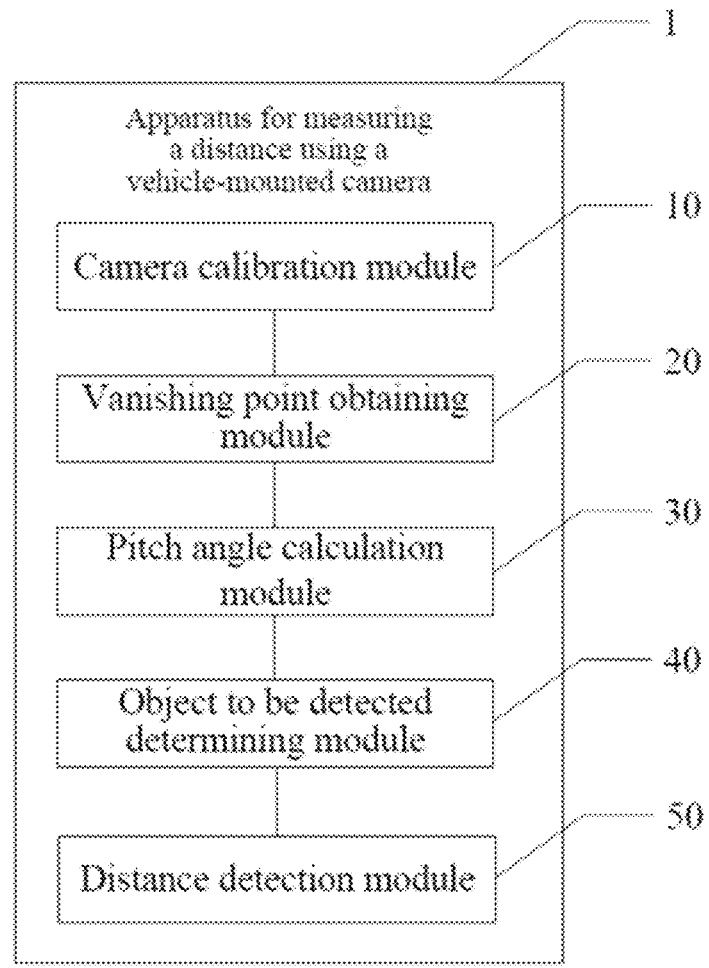
FIG. 7 schematically illustrates a block diagram of an apparatus for measuring a distance using a vehicle-mounted camera according to an exemplary embodiment of the present disclosure.

FIG. 7 schematically illustrates a block diagram of an apparatus for measuring a distance using a vehicle-mounted camera according to an exemplary embodiment of the present disclosure. Referring to FIG. 7, the apparatus for measuring a distance using a vehicle-mounted camera according to an exemplary embodiment of the present disclosure may include a camera calibrator 10, a vanishing point obtainer 20, a pitch angle calculator 30, an object to be detected determiner 40, and a distance detector 50.

The camera calibrator 10 may be configured to calibrate a camera based on camera calibration images to obtain a camera parameter.

The vanishing point obtainer 20 may be configured to detect parallel lane lines to obtain a vanishing point of the parallel lane lines according to the detected parallel lane lines.

The pitch angle calculator 30 may be configured to calculate a pitch angle of the camera according to the camera parameter and the vanishing point.

The object to be detected determiner 40 may be configured to determine information of an object to be detected in an image captured by the camera.

The distance detector 50 may be configured to calculate a distance from the object to be detected to the camera and a size of the object to be detected according to the information of the object to be detected, the pitch angle of the camera, and the camera parameter.

According to this exemplary embodiment of the present disclosure, the camera calibration images are at least three images obtained by capturing an image by the camera at different angles and locations.

According to an exemplary embodiment of the present disclosure, calibrating the camera calibration images includes: calibrating the camera calibration images using a Zhang Zhengyou calibration algorithm.

According to an exemplary embodiment of the present disclosure, the detecting parallel lane lines includes: capturing an image containing the parallel lane lines; filtering the image containing the parallel lane lines by using a gradient edge detection operator to generate a gradient image; determining an optimal threshold of the gradient image by using a threshold determination algorithm, and performing binarization processing on the gradient image to obtain an edge pattern; detecting a straight line in the edge pattern using a feature extraction algorithm; and determining two straight lines adjacent to each other and having opposite deflection directions with respect to a height direction of the image as the parallel lane lines.

According to an exemplary embodiment of the present disclosure, the object to be detected is represented as a rectangular window. The determining of information of the object to be detected in an image captured by the camera includes: determining a coordinate of a preset point of the rectangular window corresponding to the object to be detected in the image captured by the camera as well as a width and a height of the rectangular window.

According to an exemplary embodiment of the present disclosure, the camera is installed directly in front of a vehicle.

Functional modules of a program running performance analysis apparatus of the embodiment of the present disclosure are the same as those in the above method embodiments, and thus detailed descriptions thereof are omitted herein.

In an exemplary embodiment of the present disclosure, there is further provided a computer readable storage medium storing a program product capable of implementing the above method in the specification. In some possible embodiments, aspects of the present disclosure may be implemented as a form of a program product, which includes a program code. When the program product runs on a terminal device, the program code is used for enabling the terminal device to perform the steps described in the above "exemplary method" portions of this specification according to the exemplary embodiments of the present disclosure.

Figure 8:
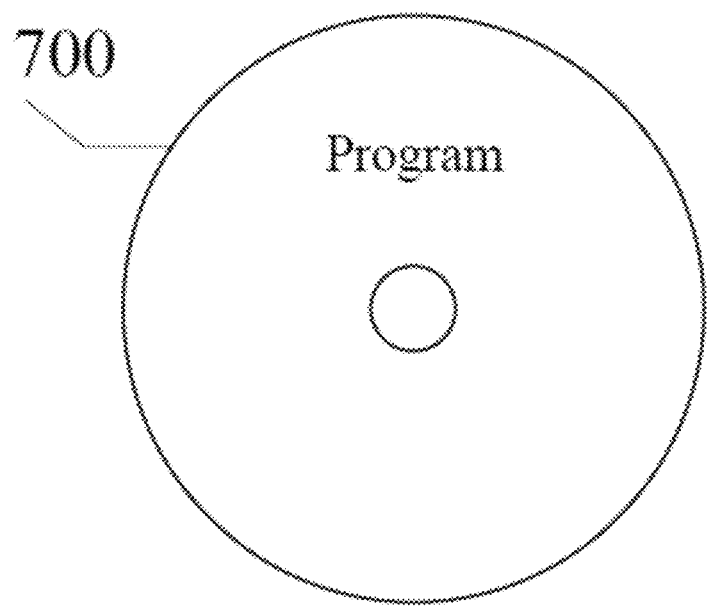
FIG. 8 illustrates a schematic diagram of a storage medium according to an exemplary embodiment of the present disclosure.

Referring to FIG. 8, a program product 700 configured to implement the above method is described according to an embodiment of the present disclosure. The program product 700 may adopt a portable compact disc read-only memory (CD-ROM) and include a program code, and may run on a terminal device such as a personal computer. However, the program product of the present disclosure is not limited thereto. In this document, a readable storage medium may be any non-transitory tangible medium that can contain or store a program for use by or in connection with an instruction execution system, apparatus, or device.

Any combination of one or more readable medium(s), such as a non-transitory computer-readable medium(s), may be utilized by the program product. The readable medium may be a readable signal medium or a readable storage medium. The readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the readable storage medium include the following: an electrical connection having one or more wires, a portable diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer readable signal medium may include a propagated data signal with readable program code embodied therein, in baseband or as part of a carrier wave. Such propagated data signal may take a variety of forms, including, but not limited to, electro-magnetic, optical, or any suitable combination thereof. A readable signal medium may be any readable medium that is not a readable storage medium and that can communicate, propagate, or transport a program for use by or in connection with an instruction execution system, apparatus, or device.

Program code embodied on a readable medium may be transmitted using any appropriate medium, including but not limited to wireless, wireline, optical fiber cable, RF, etc., or any suitable combination of the foregoing.

Program code for carrying out operations of the present disclosure may be written in any combination of one or more programming languages, including an object-oriented programming language such as Java, C++, or the like and conventional procedural programming languages, such as "C" programming language or similar programming languages. The program code may be executed entirely on a user's computing device, partly on the user's computing device, as a stand-alone software package, partly on the user's computing device and partly on a remote computing device or entirely on the remote computing device or a server. In a scenario involved with the remote computing device, the remote computing device may be coupled to the user's computing device through any type of network, including a local area network (LAN) or a wide area network (WAN), or may be coupled to an external computing device (for example, through the Internet using an Internet Service Provider).

In an exemplary embodiment of the present disclosure, there is further provided an electronic device capable of implementing the above method.

As will be appreciated by one skilled in the art, various aspects of the present disclosure may be embodied as a system, method, non-transitory computer-readable medium, or program product. Accordingly, various aspects of the present disclosure may take the form of an entirely hardware implementation, an entirely software implementation (including firmware, micro-code, etc.) or an implementation combining software and hardware aspects, that may all generally be referred to herein as a "circuit," "module", or "system."

An electronic device 800 according to an embodiment of the present disclosure is described below with reference to FIG. 9. The electronic device 800 as shown in FIG. 9 is merely an example, and no limitation should be imposed on functions or scope of use of embodiments of the present disclosure.

Figure 9:
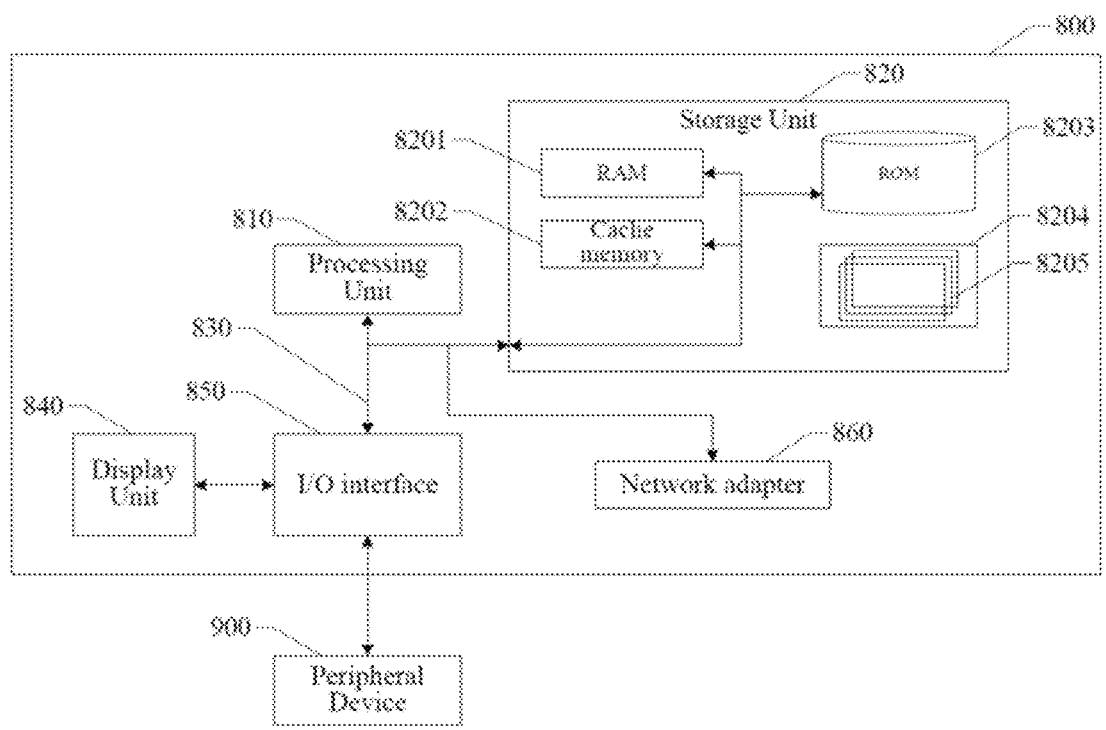
FIG. 9 schematically illustrates a block diagram of an electronic device according to an exemplary embodiment of the present disclosure.

As shown in FIG. 9, the electronic device 800 is shown in form of a general-purpose computing device. Components of the electronic device 800 may include, but are not limited to: at least one processing unit 810, at least one storage unit 820, a bus 830 connecting different system components (including a storage unit 820 and a processing unit 810), and a display unit 840.

The storage unit stores a program code, which may be executed by the processing unit 810, such that the processing unit 810 performs steps described in the "exemplary method" portions of the specification according to exemplary embodiments of the present disclosure. For example, the processing unit 810 may perform the steps as shown in FIG. 1, including Step S10: calibrating a camera based on camera calibration images to obtain a camera parameter; Step S20: detecting parallel lane lines to obtain a vanishing point of the parallel lane lines according to the detected parallel lane lines; Step S30: calculating a pitch angle of the camera according to the camera parameter and the vanishing point; Step S40: determining information of an object to be detected in an image captured by the camera; and Step S50: calculating a distance from the object to be detected to the camera and a size of the object to be detected according to the information of the object to be detected, the pitch angle of the camera, and the camera parameter.

The storage unit 820 may include readable media in form of volatile storage unit, such as a random access memory (RAM) 8201 and/or a cache memory 8202. Furthermore, the storage unit 820 may further include a read-only memory (ROM) 8203.

The storage unit 820 may include a program/utility tool 8204 having a group of (at least one) program module(s) 8205. The program modules 8205 include, but are not limited to: an operating system, one or more applications, other program modules and program data. Each or a certain combination of these examples may include implementation of network environment.

The bus 830 may represent one or more of a plurality of bus structures, including a memory bus or memory controller, a peripheral bus, an accelerated graphics port, a processing unit or a local bus using any bus structure among the plurality of bus structures.

The electronic device 800 may communicate with one or more peripheral devices 900 (such as a keyboard, a pointing device, a Bluetooth device, etc.), and also may communicate with one or more devices allowing a user to interact with the electronic device 800, and/or may communicate with any device (for example, a router, a modem and so on) allowing the electronic device 800 to communicate with one or more other computing devices. This communication may be implemented by means of an input/output (I/O) interface 850. Moreover, the electronic device 800 also may communicate with one or more networks (for example, a local area network (LAN), a wide area network (WAN) and/or a public network such as Internet) via a network adapter 860. As shown, the network adapter 860 communicates with other modules of the electronic device 800 through the bus 830. It should be understood that although not shown in the figures, other hardware and/or software modules that may be used in combination with the electronic device 800, includes but are not limited to: microcode, a device driver, a redundancy processing unit, an external disk drive array, a redundant array of independent disks (RAID) system, a tape drive and a data backup and storage system, etc.

With description of the above embodiments, it will be readily understood by those skilled in the art that the exemplary embodiments described herein may be implemented by software or may be implemented by means of software in combination with necessary hardware. Thus, the technical solution according to the embodiments of the present disclosure may be embodied in form of a software product which may be stored in a nonvolatile storage medium (which may be CD-ROM, USB flash disk, mobile hard disk and the like) or on network, including a number of instructions for enabling a computing device (which may be a personal computer, a server, a terminal device, or a network device and the like) to perform the method according to the embodiments of the present disclosure.

Moreover, the above accompanying drawings are merely illustrative description of processes included in the method according to the exemplary embodiments of the present disclosure and are not intended to limit the present disclosure. It is understandable that the processes shown in the above accompanying drawings do not indicate or limit time sequences of these processes. Furthermore, it is understandable that these processes may be executed, for example, synchronously or asynchronously in a plurality of modules.

It is to be noted that although a plurality of modules or units of the device for action execution have been mentioned in the above detailed description, this partition is not compulsory. Actually, according to embodiments of the present disclosure, features, and functions of two or more modules or units as described above may be embodied in one module or unit. Conversely, features and functions of one module or unit as described above may be further embodied in more modules or units.

Other embodiments of the present disclosure will be apparent to those skilled in the art from consideration of the specification and on practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for measuring a distance using a vehicle-mounted camera, comprising:
    calibrating a camera based on camera calibration images to obtain a camera parameter, wherein the camera calibration images are at least three images obtained by capturing an objective image by the camera at different angles and locations;
    detecting parallel lane lines in an image captured by the camera to obtain a vanishing point of the parallel lane lines according to detected parallel lane lines;
    calculating a pitch angle of the camera according to the camera parameter and the vanishing point;
    determining information of an object to be detected in the image captured by the camera; and
    calculating a distance from the object to be detected to the camera and a size of the object to be detected according to the information of the object to be detected, the pitch angle of the camera, and the camera parameter, wherein the image captured by the camera contains the parallel lane lines.

2. The method for measuring the distance using the vehicle-mounted camera according to claim 1, wherein:
    calibrating of the camera based on the camera calibration images to obtain the camera parameter comprises calibrating the camera calibration images using a Zhang Zhengyou calibration algorithm.

3. The method for measuring the distance using the vehicle-mounted camera according to claim 1, wherein detecting the parallel lane lines comprises:
   filtering the image containing the parallel lane lines by using a gradient edge detection operator to generate a gradient image;
   determining an optimal threshold of the gradient image by using a threshold determination algorithm, and performing binarization processing on the gradient image to obtain an edge pattern;
   detecting a straight line in the edge pattern using a feature extraction algorithm; and
   determining two straight lines adjacent to each other and having opposite deflection directions with respect to a height direction of the image as the parallel lane lines.

4. The method for measuring the distance using the vehicle-mounted camera according to claim 1, wherein:
   the object to be detected is represented as a rectangular window; and
   the determining of information of an object to be detected in the image captured by the camera comprises determining a coordinate of an arbitrary point of the rectangular window corresponding to the object to be detected in the image captured by the camera and a width and a height of the rectangular window.

5. The method for measuring the distance using the vehicle-mounted camera according to claim 1, wherein a coordinate of the vanishing point in the image captured by the camera is denoted as $(u_0, v_0)$, and the pitch angle of the camera is calculated based on a formula as below:

$$\varphi = \arctan\left(\frac{c_v - v_0}{f_v}\right)$$

wherein $\varphi$ represents the pitch angle, $f_v$ represents a focal length of a camera head of the camera, and $c_v$ represents a location coordinate of an optical center of the camera head.

6. The method for measuring the distance using the vehicle-mounted camera according to claim 4, wherein the size of the object to be detected comprises a height and a width of the object to be detected.

7. The method for measuring the distance using the vehicle-mounted camera according to claim 4, wherein the distance from the object to be detected to the camera is calculated based on a formula as below:

$$D = \frac{f_v h_c + h_c(c_v - v_{t2}) \tan(\varphi)}{v_{t2} - v_0}$$

wherein D represents the distance from the object to be detected to the camera, $\varphi$ represents the pitch angle, $f_v$ represents a focal length of a camera head of the camera, $c_v$ represents a location coordinate of an optical center of the camera head, and a coordinate of a midpoint of a lower side of the rectangular window in the image is denoted as $(u_{t2}, v_{t2})$ and a corresponding spatial point coordinate is denoted as $(x_{t2}, D, -h_c)$, and a coordinate of the vanishing point in the image captured by the camera is denoted as $(u_0, v_0)$.

8. The method for measuring the distance using the vehicle-mounted camera according to claim 6, wherein the height of the object to be detected is calculated based on a formula as below:

$$H = \frac{h_t(D + h_c \tan(\varphi))}{f_v + (c_v - v_t) \tan(\varphi)}$$

wherein H represents the height of the object to be detected, D represents the distance from the object to be detected to the camera, $\varphi$ represents the pitch angle, $h_t$ represents the height of the rectangular window, $f_v$ represents a focal length of a camera head of the camera, $c_v$ represents a location coordinate of an optical center of the camera head, the coordinate of the arbitrary point is denoted as $(u_t, v_t)$, and a coordinate of a midpoint of a lower side of the rectangular window in the image is denoted as $(u_{t2}, v_{t2})$ and a corresponding spatial point coordinate is denoted as $(x_{t2}, D, -h_c)$.

9. The method for measuring the distance using the vehicle-mounted camera according to claim 6, wherein the width of the object to be detected is calculated based on a formula as below:

$$W = \frac{w_t}{f_u}(D \cos(\varphi) + h_c \sin(\varphi))$$

wherein W represents the width of the object to be detected, D represents the distance from the object to be detected to the camera, $\varphi$ represents the pitch angle, $f_u$ represents a focal length of a camera head of the camera, $w_t$ represents the width of the rectangular window, and a coordinate of a midpoint of a lower side of the rectangular window in the image is denoted as $(u_{t2}, v_{t2})$ and a corresponding spatial point coordinate is denoted as $(x_{t2}, D, -h_c)$.

10. A non-transitory computer-readable storage medium storing a computer program thereon, wherein when the computer program is executed by a processor, a method for measuring a distance using a vehicle-mounted camera is implemented, the method for measuring the distance using the vehicle-mounted camera comprising:
   calibrating a camera based on camera calibration images to obtain a camera parameter, wherein the camera calibration images are at least three images obtained by capturing an objective image by the camera at different angles and locations;
   detecting parallel lane lines in an image captured by the camera to obtain a vanishing point of the parallel lane lines according to detected parallel lane lines;
   calculating a pitch angle of the camera according to the camera parameter and the vanishing point;
   determining information of an object to be detected in the image captured by the camera; and
   calculating a distance from the object to be detected to the camera and a size of the object to be detected according to the information of the object to be detected, the pitch angle of the camera, and the camera parameter, wherein the image captured by the camera contains the parallel lane lines.

11. An electronic device, comprising:
   at least one hardware processor; and
   a memory configured to store executable instructions of the at least one hardware processor;
   wherein the at least one hardware processor is configured to perform a method for measuring a distance using a vehicle-mounted camera by executing the executable instructions comprising:

calibrating a camera based on camera calibration images to obtain a camera parameter, wherein the camera calibration images are at least three images obtained by capturing an objective image by the camera at different angles and locations;

detecting parallel lane lines in an image captured by the camera to obtain a vanishing point of the parallel lane lines according to detected parallel lane lines;

calculating a pitch angle of the camera according to the camera parameter and the vanishing point;

determining information of an object to be detected in the image captured by the camera; and calculating a distance from the object to be detected to the camera and a size of the object to be detected according to the information of the object to be detected, the pitch angle of the camera, and the camera parameter, wherein the image captured by the camera contains the parallel lane lines.

12. The electronic device according to claim 11, wherein:
calibrating of the camera based on the camera calibration images to obtain the camera parameter comprises calibrating the camera calibration images using a Zhang Zhengyou calibration algorithm.

13. The electronic device according to claim 11, wherein detecting the parallel lane lines comprises:

filtering the image containing the parallel lane lines by using a gradient edge detection operator to generate a gradient image;

determining an optimal threshold of the gradient image by using a threshold determination algorithm, and performing binarization processing on the gradient image to obtain an edge pattern;

detecting a straight line in the edge pattern using a feature extraction algorithm; and determining two straight lines adjacent to each other and having opposite deflection directions with respect to a height direction of the image as the parallel lane lines.

14. The electronic device according to claim 11, wherein:
the object to be detected is represented as a rectangular window; and the determining of information of an object to be detected in the image captured by the camera comprises:

determining a coordinate of an arbitrary point of the rectangular window corresponding to the object to be detected in the image captured by the camera and a width and a height of the rectangular window.

15. The electronic device according to claim 11, wherein a coordinate of the vanishing point in the image captured by the camera is denoted as $(u_0, v_0)$, and the pitch angle of the camera is calculated based on a formula as below:

$$\varphi = \arctan\left(\frac{c_v - v_0}{f_v}\right)$$

wherein $\varphi$ represents the pitch angle, $f_v$ represents a focal length of a camera head of the camera, and $c_v$ represents a location coordinate of an optical center of the camera head.

16. The electronic device according to claim 14, wherein the size of the object to be detected comprises a height and a width of the object to be detected.

17. The electronic device according to claim 14, wherein the distance from the object to be detected to the camera is calculated based on a formula as below:

$$D = \frac{f_v h_c + h_c(c_v - v_{t2}) \tan(\varphi)}{v_{t2} - v_0}$$

wherein D represents the distance from the object to be detected to the camera, $\varphi$ represents the pitch angle, $f_v$ represents a focal length of a camera head of the camera, $c_v$ represents a location coordinate of an optical center of the camera head, and a coordinate of a midpoint of a lower side of the rectangular window in the image is denoted as $(u_{t2}, v_{t2})$ and a corresponding spatial point coordinate is denoted as $(x_{t2}, D, -h_c)$, and a coordinate of the vanishing point in the image captured by the camera is denoted as $(u_0, v_0)$.

18. The electronic device according to claim 16, wherein the height of the object to be detected is calculated based on a formula as below:

$$H = \frac{h_t(D + h_c \tan(\varphi))}{f_v + (c_v - v_t) \tan(\varphi)}$$

wherein H represents the height of the object to be detected, D represents the distance from the object to be detected to the camera, $\varphi$ represents the pitch angle, $h_t$ represents the height of the rectangular window, $f_v$ represents a focal length of a camera head of the camera, $c_v$ represents a location coordinate of an optical center of the camera head, the coordinate of the arbitrary point is denoted as $(u_t, v_t)$, and a coordinate of a midpoint of a lower side of the rectangular window in the image is denoted as $(u_{t2}, v_{t2})$ and a corresponding spatial point coordinate is denoted as $(x_{t2}, D, -h_c)$, and wherein the width of the object to be detected is calculated based on a formula as below:

$$W = \frac{w_t}{f_u}(D \cos(\varphi) + h_c \sin(\varphi))$$

wherein W represents the width of the object to be detected, D represents the distance from the object to be detected to the camera, $\varphi$ represents the pitch angle, $f_u$ represents a focal length of a camera head of the camera, $w_t$ represents the width of the rectangular window, and a coordinate of a midpoint of a lower side of the rectangular window in the image is denoted as $(u_{t2}, v_{t2})$ and a corresponding spatial point coordinate is denoted as $(x_{t2}, D, -h_c)$.

19. The non-transitory computer-readable storage medium according to claim 10, wherein:

calibrating of the camera based on the camera calibration images to obtain the camera parameter comprises calibrating the camera calibration images using a Zhang Zhengyou calibration algorithm.

20. The non-transitory computer-readable storage medium according to claim 10, wherein detecting the parallel lane lines comprises:

filtering the image containing the parallel lane lines by using a gradient edge detection operator to generate a gradient image;

determining an optimal threshold of the gradient image by using a threshold determination algorithm, and performing binarization processing on the gradient image to obtain an edge pattern;

detecting a straight line in the edge pattern using a feature extraction algorithm; and determining two straight lines adjacent to each other and having opposite deflection directions with respect to a height direction of the image as the parallel lane lines.

* * * * *